United States Patent Office 2,758,991
Patented Aug. 14, 1956

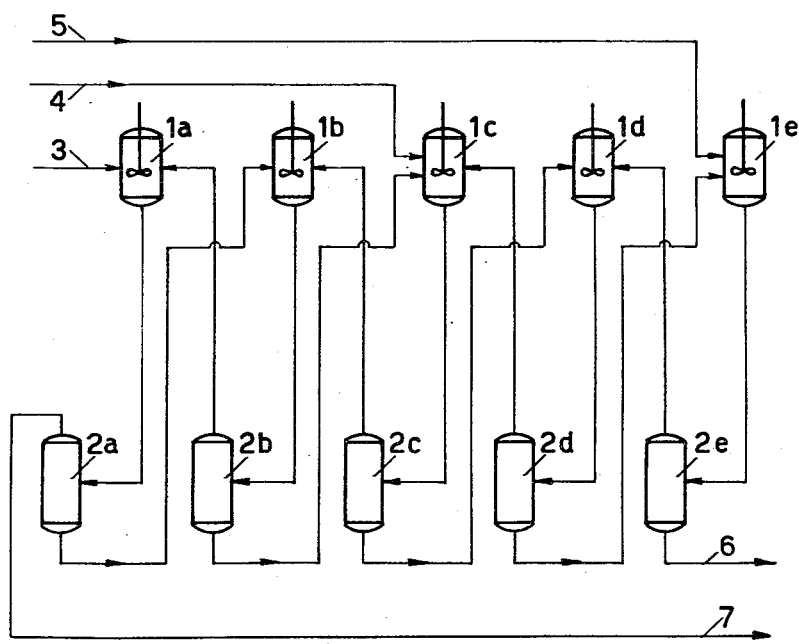

2,758,991

PROCESS FOR THE PURIFICATION OF LACTAMS

Leonardus M. Kretzers, Sittard, and Anton Niks and Paulus H. de Bruin, Geleen, Netherlands, assignors to Stamicarbon N. V., Heerlen, Netherlands Application March 15, 1954, Serial No. 416,326

Claims priority, application Netherlands March 19, 1953

7 Claims. (Cl. 260—239.3)

The present invention relates to a process for the purification of lactams.

It is well-known that lactams, which are obtained by rearrangement of cyclic ketoximes according to the Beckmann transformation or by depolymerization of polyamides prepared from lactams or by washing polymerized products prepared from lactams or by other methods, contain impurities which, even after repeated distillation of the lactam, cannot be removed completely. These impurities cause discolorations of the lactam. The discolorations are especially noticeable when the impure lactam is subjected to the influence of light and air. Such impure lactams are less desirable than purified lactams for the preparation of polymers as the impurities likewise cause discolorations of such polymers and these polymers cannot be used in the manufacture of filaments, fibers, films and other molded products whenever such discolorations are objectionable.

Various methods of removing these impurities have been described such as the vacuum distillation of the lactam in the presence of oxidizing or reducing substances which show an alkaline or an acid reaction. In such a process rather great losses of lactam are involved. In copending application Ser. No. 389,855, filed November 2, 1952, a method is described according to which the impurities which are difficult to separate are converted into other products more easily separable. The conversion is effected by an oxidation which is so controlled that either none or hardly any lactam is oxidized. The oxidized impurities are subsequently separated by distilling off the lactam or by a treatment with ion exchangers. The ion exchange treatment can be combined with a treatment with surface-active adsorbents as described, for example, in the specification of copending application Ser. No. 390,716, filed November 6, 1953.

Furthermore it has already been proposed to extract the lactam from water-containing lactam oil by means of organic solvents, such as benzene. In copending application Ser. No. 374,758, filed August 17, 1953, it is stated that the impurities are removed to a considerable extent in this manner when starting from a water-containing lactam oil containing more than 80% of lactam.

It is an object of the present invention to provide a novel procedure for purifying lactams whereby the above-mentioned difficulties are avoided.

A more specific object of the invention is to provide a lactam purifying process which so effectively eliminates contaminants from the lactam that the latter is free from any tendency to discolor upon exposure to air or light or both and is otherwise highly desirable for use in the production of polymers and polymeric products.

A further object of the invention is to provide a process for purifying contaminated lactams whereby all of the contaminating materials may be separated from the lactam with little or substantially no loss of lactam.

An additional object of the invention is to provide a lactam purifying process which requires the use of only relatively simple and inexpensive equipment and is otherwise highly desirable from a commercial standpoint.

Still further objects and the entire scope of applicability of the present invention will become apparent from the detailed description given hereinafter; it should be understood, however, that the detailed description and specific examples, while indicating preferred embodiments of the invention are given by way of illustration only, since various changes and modifications within the spirit and scope of the invention will become apparent to those skilled in the art from this detailed description.

The foregoing objects are realized according to the present invention, by a process which comprises the steps of starting with a solution of impure lactam in an organic solvent immiscible with water, such as benzene and toluene, extracting with water and following this by an extraction of the resulting aqueous solution with a small amount of an organic solvent not appreciably miscible with water. The extraction of the caprolactam from the organic solvent by means of water is preferably carried out in a plurality of stages and in countercurrent fashion. The after-treatment of the resulting aqueous extract with fresh organic solvent is also advantageously carried out in a plurality of stages and preferably in countercurrent manner.

The solvent for the after-treatment of the aqueous solution preferably is the same solvent as that used for dissolving the crude lactam, so that, when the process is carried out in countercurrent manner, all impurities may be discharged at the same place. To obtain very pure products this method of purification can be combined with other purification methods, e. g., the solution of lactam used as the starting material may be obtained by extraction of a solution containing more than 80% of crude lactam in water.

As the purified lactam is obtained in the form of a dilute aqueous solution, the present method of purification may readily be combined with a treatment of the solution with ion exchangers and, if desired, with surface-active adsorbents. By evaporating the water at reduced pressure a highly concentrated lactam or a lactam containing practically no water is readily obtained and this lactam can be used direct in the polymerization reaction.

In most cases, however, the extraction according to the present invention is sufficient by itself to produce a monomer of satisfactory purity.

The process of the invention is suitable for purifying lactams derived from any source. Thus, for example, lactams obtained by Beckmann transformation of cyclic ketoximes, e. g., cyclopentanonoxime, cyclohexanonoxime, cycloheptanonoxime and their alkylated derivatives, by deploymerization of polyamides prepared from lactams or by washing polymerized products prepared from lactams may be purified by this process. As typical examples of such lactams there may be mentioned butyrolactam, valerolactam, caprolactam, ω-amino-heptanoic acid lactam and ω-amino-heptadecanoic acid lactam. Epsilon caprolactam is the preferred lactam to be purified according to the present invention.

Cation exchange resins which are suitable contain strong acid groups and include sulfonated mono vinyl aromatic hydrocarbon-divinyl aromatic hydrocarbon copolymers and other sulfonated copolymers such as those mentioned in D'Alelio Patent No. 2,366,007 and sulfonated condensation products of phenols with aldehydes, e. g., sulfonated resorcinol-formaldehyde. Suitable anion exchangers for use in the present process are for example, tertiary sulfonium bases of high molecular weight and quaternary ammonium bases of high molecular weight such as a mono vinyl aromatic compound-divinyl aromatic compound copolymer which has been chloromethylated and then reacted with a tertiary amine to form the quaternary ammonium compound which is treated with a strong alkali to form the free base. Typical examples of such quaternary ammonium polymeric bases are shown in McBurney Patent 2,591,573. In the case where the ion exchangers are arranged in series with the anion exchanger placed at the end it is also desirable to use a pH correction filter to neutralize the solution and prevent hydrolysis of the lactam into the corresponding aminoacid in the otherwise alkaline solution. In order to bind non-ionogenic impurities which may be present, use may be made of any of the well known surface active substances such as active coal, bleaching earth or other adsorptive agents. These substances may be used in the form of a filter bed position before or after the ion exchangers.

Instead of using ion exchangers to and in separating the lactam from the impurities, the separation can be accomplished by removing substantially all the water from the aqueous lactam solution subsequent to the organic solvent extraction. The water is preferably removed in vacuo. The lactam is then recovered by distillation, preferably carried out in vacuo, and in the presence of a small amount of an alkali metal hydroxide, preferably sodium hydroxide in an amount of from 0.5 to 2 parts per 100 parts of lactam to be distilled.

As organic solvents which are at best only slightly miscible with water we can use aromatic and hydroaromatic hydrocarbons such as benzene, toluene and decahydronaphthalene, halogenated hydrocarbons such as chloroform, perhalogenated hydrocarbons such as carbon tetrachloride and nitrohydrocarbons such as nitromethane, although it will be appreciated that the invention is not restricted to the use of the specific water immiscible solvents.

A more complete understanding of this invention and the operation thereof may be had by reference to the following illustrative examples of actual operation in accordance with the invention.

Example 1

1000 g. of a yellow 20% solution of epsilon caprolactam in benzene (the lactam being obtained from Beckmann rearrangement of cyclohexanone-oxime) was extracted with 800 g. of water in all, used in three equal portions.

The aqueous extracts were combined and further extracted with 100 g. of pure benzene. This small proportion of benzene does not dissolve any appreciable amount of lactam.

The yellow color was almost entirely retained by the benzene in the first extraction. The resulting aqueous solution after the final extraction with benzene was practically colorless and contained 19.3% of caprolactam. This aqueous solution was evaporated in vacuo until almost all the water was removed. Then 1 g. of NaOH in the form of a concentrated aqueous solution was added and the lactam was distilled in vacuo of 15 mm., the lactam obtained in this manner was of excellent quality and completely resistant to the influence of light.

Example 2

1000 g. of a 20% solution of caprolactam in benzene, obtained by oxidizing 1000 g. of crude 20% lactam solution in benzene with 3 g. of $KMnO_4$ at boiling temperature, and separating the manganese dioxide, was extracted with water and with benzene, as described in Example 1. The crude lactam was obtained from Beckmann rearrangement of cyclohexanone-oxime.

By heating in vacuo the last traces of benzene were removed, after which this solution was passed successively through three columns filled respectively with activated carbon, a cation exchanger (Dowex-50), sulfonated styrene-divinyl benzene copolymer, an anion exchanger (Dowex-2), a quaternary ammonium compound made from a chloromethylated styrene-divinyl benzene copolymer by reaction with a tertiary amine and in the form of the free base and through a pH correction filter consisting of a mixed bed of Dowex-50 and Dowex-2 to neutralize the solution. Subsequently, the aqueous solution was evaporated in vacuo to recover the lactam. The lactam and the polymers prepared from it remained colorless, even when subjected for a long time to atmospheric conditions.

Example 3

1000 g. of a 10% solution of caprolactam in benzene (the lactam being obtained from Beckmann rearrangement of cyclohexanone-oxime) was extracted five times, using 80 g. of water for each extraction. The aqueous extracts were combined and then extracted with 50 g. of pure benzene.

After the benzene layer had been separated, the last traces of benzene were removed from the aqueous solution, which contained 19.1% of caprolactam, by heating in vacuo, after which the solution was processed from this point in the manner described in Example 2.

A very stable caprolactam product was obtained in Example 3 by the treatment employed.

Example 4

500 g. of a yellow 20% solution of caprolactam in toluene (the lactam being obtained from Beckmann rearrangement of cyclohexanone-oxime) was extracted four times, using 100 g. of water for each extraction. The aqueous extracts were combined and extracted twice, each time using 25 g. of pure toluene.

The aqueous layer, which was now practically colorless and contained 18.9% of caprolactam was evaporated in vacuo substantially to dryness; finally the lactam was recovered by distillation with 0.5% of NaOH. The resulting lactam and the polymer prepared from it were highly resistant to change under the influence of light.

Example 5

In this example there is used a 5 stage counter-current extraction apparatus which is shown diagrammatically in the accompanying drawing. Through conduit 4 a 25% solution of impure caprolactam in benzene (the lactam being obtained from Beckmann rearrangement of cyclohexanone-oxime) is supplied and washed in counter-current with pure water, through the use of the mixing vessel 1c, the separating vessel 2c, the mixing vessel 1b, the separating vessel 2b, the mixing vessel 1a and the separating vessel 2a. The pure water is supplied through conduit 3. The benzene layer, which contained practically no caprolactam, is discharged from vessel 2a through conduit 7. The solution of caprolactam in water in separating vessel 2c is passed to mixing vessel 1d and is washed in counter-current fashion with fresh benzene which is supplied through conduit 5 to mixing vessel 1e and then passes to separating vessel 2e, next to mixing vessel 1d and then to separating vessel 2d.

The purified solution of caprolactam is discharged from vessel 2e through conduit 6. In the mixing vessel 1c the benzene, which still contained slight amounts of impurities taken up from the relatively pure caprolactam in the counter-current extraction is added to the solution of impure caprolactam supplied in benzene. For every 1000 g. of impure 25% solution of caprolactam in benzene, 1000 g. of water and 250 g. of pure benzene are supplied and about 1000 g. of yellow benzene and about 1250 g. of colorless 20% aqueous lactam solution are discharged.

From the aqueous solution of purified lactam the last traces of benzene are removed by heating in vacuo, after which the solution is passed over active coal and ion exchangers in the manner described in Example 2.

After evaporation of the water a lactam is recovered which does not show any tendency to discolor even when kept for long periods of time.

Example 6

1000 g. of a yellow 30% solution of caprolactam in benzene (the lactam being obtained from Beckmann rearrangement of cyclohexanone-oxime) was extracted four times, each extraction being with 225 g. of water. The aqueous extracts were combined and further extracted with 100 g. of pure benzene. After removal of the last traces of benzene an aqueous solution was left which contained 24.4% of caprolactam. This solution was processed from this point in the manner described in Example 2. The lactam recovered was completely colorless and colorfast.

In summary, it may be stated therefore that according to the present invention a process for the purification of lactams is provided which comprises extracting the lactam with water from a solution of the crude lactam in an organic solvent which is at best only slightly miscible with water and subjecting the resulting aqueous extract to an aftertreatment with a small amount of an organic solvent not appreciably miscible with water.

Preferably, this aftertreatment is carried out with the same solvent as is used to dissolve the lactam to be purified.

In a preferred mode of carrying out the invention the extraction and the aftertreatment are carried out in a plurality of stages in counter-current fashion.

It will be appreciated that various modifications can be made in the invention as described above without in any way deviating from the scope thereof as defined in the appended claims.

We claim:

1. A process for the purification of lactams, which comprises extracting the lactam with water from a solution of the crude lactam in an organic solvent at best only slightly miscible with water, and subjecting the resulting aqueous extract to an aftertreatment with an organic solvent not appreciably miscible with water and in an amount insufficient to dissolve any appreciable amount of lactam.

2. A process according to claim 1 wherein the solvent used for the aftertreatment for the aqueous extraction is the same for that used for dissolving the crude lactam.

3. A process for the purification of lactams, which comprises extracting the lactam with water from a solution of the crude lactam in an organic solvent at best only slightly miscible with water, and subjecting the resulting aqueous extract to an aftertreatment with a lesser amount of an organic solvent not appreciably miscible with water and in an amount insufficient to dissolve any appreciable amount of lactam.

4. The process of claim 1 wherein the organic solvent is an aromatic hydrocarbon.

5. The process of claim 1 wherein the organic solvent is benzene.

6. The process of claim 1 wherein the organic solvent is toluene.

7. The process of claim 1 wherein the lactam is caprolactam.

References Cited in the file of this patent

UNITED STATES PATENTS

| | | |
|---|---|---|
| 1,659,190 | Bub | Feb. 14, 1928 |
| 2,419,256 | Dorn | Apr. 22, 1947 |
| 2,462,009 | Morris et al. | Feb. 15, 1949 |
| 2,594,556 | Hartley | Apr. 29, 1952 |
| 2,692,878 | Kahr | Oct. 26, 1954 |

FOREIGN PATENTS

| | | |
|---|---|---|
| 504,774 | Belgium | Aug. 14, 1951 |
| 748,460 | Germany | Nov. 3, 1944 |